United States Patent [19]

Dutro et al.

[11] Patent Number: 4,966,401
[45] Date of Patent: Oct. 30, 1990

[54] EXTENSION GLIDE SYSTEM FOR MOUNTING TRUCK STORAGE BOX

[76] Inventors: Scott G. Dutro, 17002 NE. 172nd Pl., Woodinville, Wash. 98072; Terry D. Dutro, 10711 SE. 30th, Bellevue, Wash. 98004

[21] Appl. No.: 271,014

[22] Filed: Nov. 14, 1988

[51] Int. Cl.⁵ ............................................. B60R 11/06
[52] U.S. Cl. ................................. 296/37.6; 296/37.7; 211/151; 224/42.41; 224/42.46 R; 224/281
[58] Field of Search ...................... 296/37.5, 37.6, 37.7, 296/37.1; 211/151, 162; 224/42.41, 42.43, 42.44, 42.46 R, 281

[56] References Cited

U.S. PATENT DOCUMENTS

| | | | |
|---|---|---|---|
| 439,869 | 11/1890 | Edwards | 211/151 |
| 1,975,327 | 10/1934 | Loney | 211/151 X |
| 4,240,353 | 12/1980 | Barth | 211/162 X |
| 4,383,614 | 5/1983 | Miller | 211/151 X |
| 4,573,731 | 3/1986 | Knaack et al. | 296/37.6 |
| 4,771,901 | 9/1988 | Griswold et al. | 211/151 |

FOREIGN PATENT DOCUMENTS

| | | | |
|---|---|---|---|
| 236740 | 7/1911 | Fed. Rep. of Germany | 296/37.6 |
| 2164610 | 3/1986 | United Kingdom | 296/37.1 |

*Primary Examiner*—Margaret A. Focarino
*Assistant Examiner*—Andrew C. Pike
*Attorney, Agent, or Firm*—Harry M. Cross, Jr.

[57] ABSTRACT

The present invention provides a truck frame-mounted tool box glide system that can carry a hinged-lid type tool box. The glide system can store the tool box out of the way beneath a truck flat bed. The system permits the tool box to be pulled laterally out from the side of the truck until the box lid is completely exposed so that the lid can be swung upward to fully expose the box interior. Such a system permits full utilization of the tool box interior, even for heavy objects that can be lifted vertically into and out of the box. The system may provide for dual tool box mountings, where one tool box is mounted to each side of the truck.

10 Claims, 2 Drawing Sheets

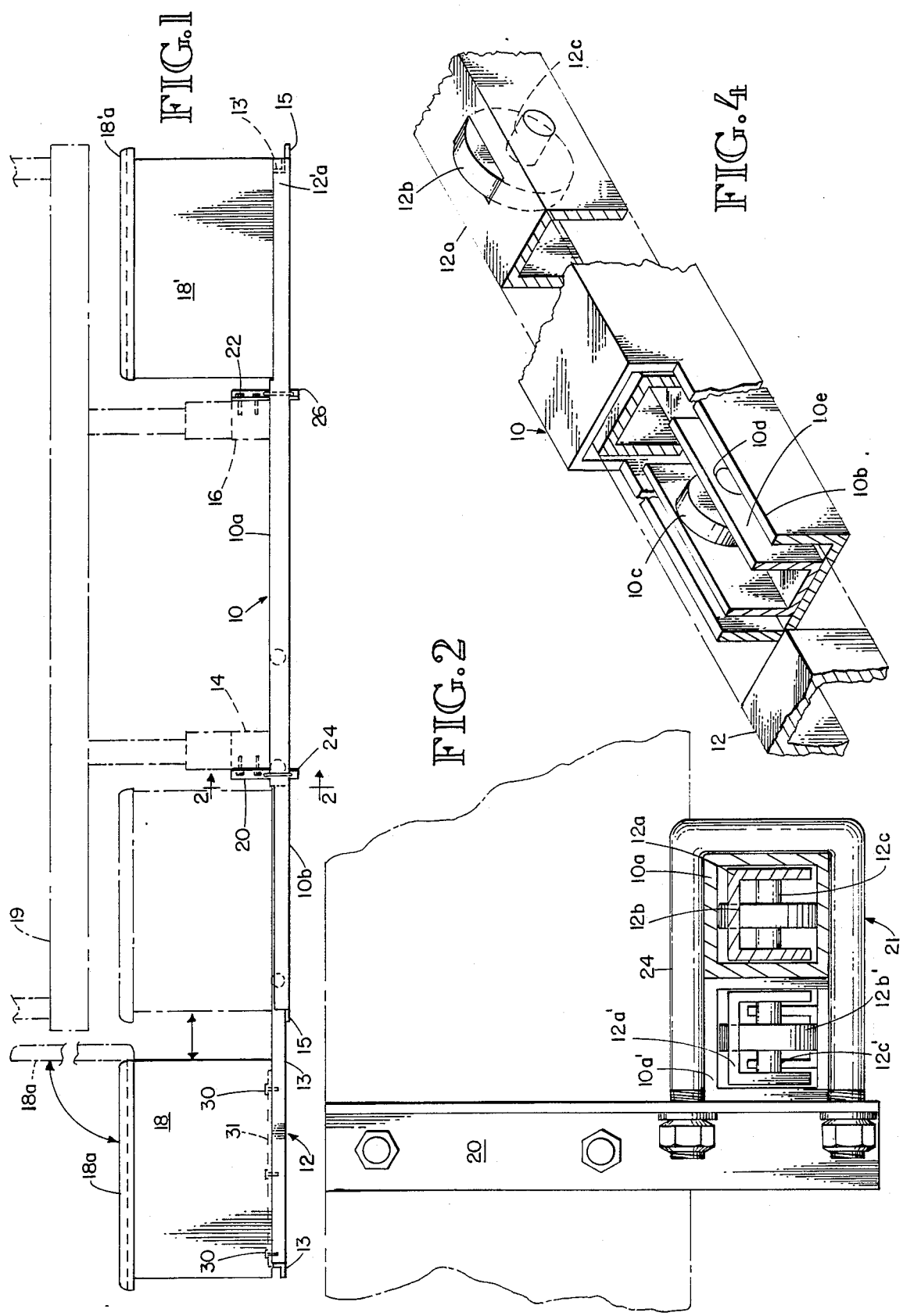

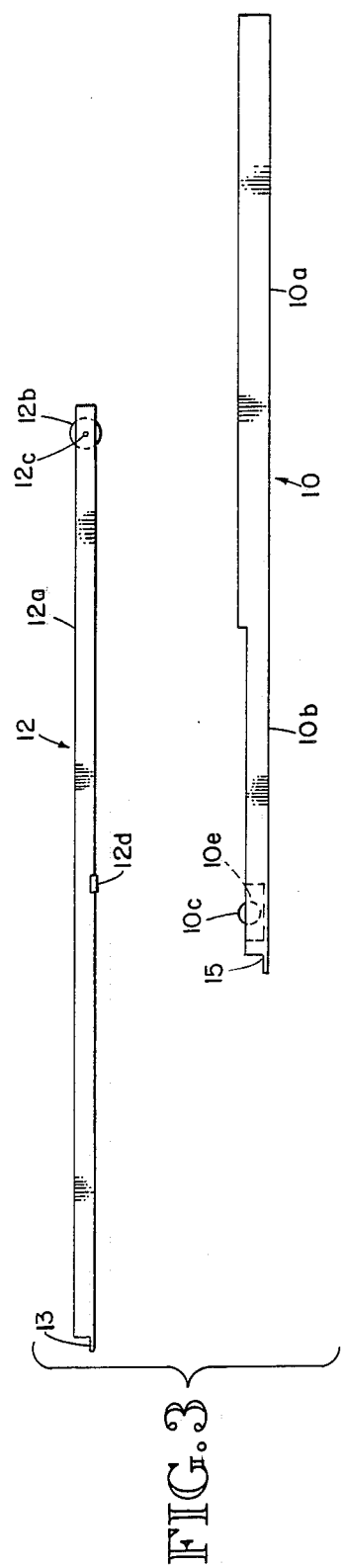

EXTENSION GLIDE SYSTEM FOR MOUNTING TRUCK STORAGE BOX

FIELD OF THE INVENTION

This invention pertains to truck-mounted accessories and more particularly to tool box carrying systems that employ extensible rails for storing a tool box beneath a truck bed.

BACKGROUND OF THE INVENTION

Trucks and tool boxes seem to go together inasmuch as tradesmen and craftsmen carry the tools of their trade around with them. Flatbed trucks pose a special problem for carrying tool boxes because of the need to store the tool box off the truck bed. Past efforts to carry flatbed tool boxes have centered around the use of mounting systems that attach the tool box directly to the truck underframe. Such a mounting requires the use of a tool box design that employs a sliding or side-hinged door, as opposed to an upwardly-opening hinged lid. Because such mounting designs confine the tool box beneath the truck structure, there is no room for opening a top, hinged lid. The result is that side door tool boxes must be employed.

With side door tool boxes, however, access to the tool box interior is limited. Tools stored in the back of the box are hard to reach without removing material nearer the side door. Consequently, such tool boxes are inconvenient to use if filled to capacity. Moreover, heavy tools and other objects are difficult to insert and remove from a side-opening tool box. Such material is often, therefore, not stored in such tool boxes.

SUMMARY OF THE INVENTION

The present invention provides a truck frame-mounted tool box glide system that can carry a hinged-lid type tool box. The glide system can store the tool box out of the way beneath a truck flatbed. The system permits the tool box to be pulled laterally out from the side of the truck until the box lid is completely exposed so that the lid can be swung upward to fully expose the box interior. Such a system permits full utilization of the tool box interior, even for heavy objects that can be lifted vertically into and out of the box. The system may provide for dual tool box mountings, where one tool box is mounted to each side of the truck.

Although the system is herein described as a tool box mounting, it is to be understood that any kind of storage container may be carried by the system. Furthermore, although the system is herein described as a mounting to a flatbed truck, it is to be understood that the system may be attached to any truck frame where overhead clearance is limited but yet sufficient to accomodate a storage container. For example, the system of this invention could be mounted to semi-truck tractors; trucks having other superstructures than flatbeds behind the truck cab, such as panel trucks, dump trucks, highway truck vans, and the like. The common element among these vehicles is a truck chassis provided with a pair of horizontal, rearwardly-extending main frame beams that mount a rear wheel suspension. Among these vehicles, the distance between the bottom of main frame beams and the superstructure attached to the main frame, behind the truck cab, is high enough to accomodate a storage container.

BRIEF DESCRIPTION OF THE DRAWINGS

FIG. 1 illustrates the tool box mounting system of this invention mounted to the main frame beams of a flatbed truck the view being endwise with respect to the truck;

FIG. 2 is a cross section taken along the line 2—2 of FIG. 1;

FIG. 3 illustrates the tool box-carrying extension glide removed from its mounting tubing, with the glide overlaying its mounting tubing to show relative positions when the glide is fully extended from its mounting tubing; and FIG. 4 is a fragmentary perspective view of a portion of the mounting system illustrating certain structural details.

DETAILED DESCRIPTION OF THE INVENTION

The tool box mounting system of this invention comprises, in its simplest form, a pair of mounting tubes, each of which telescopically carries an extension glide. An outer end portion of each glide is designed to extend outwardly from its mounting tube for receiving an overhead storage box. The mounting tubes are attached to the underside of the rearwardly-extending truck main frame beams. The mounting tubes are mounted parallel to one another, at right angles to the truck longitudinal axis, and aligned with their glide protrusions extending out from the same side of the truck chassis. The mounting tubes are long enough to extend across the width between the truck main frame beams. The glides are long enough to extend out of their mounting tubes far enough to provide the necessary support for an overhead-mounted storage box. For a given storage box length, the mounting tubes are spaced apart far enough that the protruding glides will underlay the forward and rearward ends of the overhead storage box.

A preferred embodiment of the mounting system of this invention provides a dual, storage box mounting. Two pair of mounting tubes are provided, one pair for a left-side storage box and the other pair for a right-side storage box. The forward mounting tubes of each pair are mounted together to the truck main frame beams as a forward set. The rearward mounting tubes of each pair are mounted together to the truck main frame as a rearward set. It is this preferred embodiment that is shown in FIG. 1 and that is described hereinafter.

For each pair, there is a forward and rearward mounting tube 10 that telescopically contains a glide 12. The mounting tube 10 is preferably fabricated from steel tubing material, and the glide fabricated from steel channel material. The mounting tube 10 has a first portion 10a of a length sufficient to span the distance between the outer sides of a truck's main frame beams 14 and 16. The mounting tube also has a second portion 10b that extends outward from a truck main frame beam 14 for supporting a storage box 18. The second portion 10b has the top wall thereof cut away so as to provide an upwardly-opening channel. The channel member 12a of glide 12 is downwardly opening with the base wall thereof protruding above the upper edge of the mounting tubing second portion channel 10b. Because the channel member 12a of glide 12 protrudes above the mounting tube channel 10b, storage box 18 may be set on the glide channel 12a for movement along the axis of mounting tube 10, as shown in FIG. 1.

The ends of the mounting tube first portion 10a mounted to the truck main frame beams 14 and 16 by angle brackets 20 and 22 and an associated U-bolt 24, 26. The angle brackets are bolted to the outside of the adjacent main frame beam, 14 or 16, and depend from the main frame beam far enough to accomodate the U-bolt connection. The U-bolt connection encompasses the end portion of the mounting tube first portion 10a and secures it to the associated angle bracket, 20 or 22. The mounting tube 10 is thus mounted to the truck main frame beams and extends beneath them as shown in FIG. 1 and 2. Forward and rearward angle brackets and associated U-bolts are provided for the forward and rearward mounting tubes, respectively.

The glide channel 12a rides on inner and outer rotatable bearing wheels. The inner wheel is a rotatable steel bearing 12b mounted on a steel shaft 12c that, in turn, is mounted on the inner end of glide channel 12a. The bearing 12b has a large enough diameter that it protrudes above through a cut-out as shown in FIG. 4 and below the glide channel 12a, and therefore can contact either the top or bottom inner wall of the mounting tube first portion 10a. The outer wheel is a rotatable steel bearing 10c mounted on a steel shaft 10d that, in turn, is journal mounted in a channel member 10e. Channel member 10e opens upward and is fitted within the outer end of the mounting tube channel 10b. The bearing 10c has a large enough diameter that it protrudes above the second portion channel 10b, and therefore can contact the underside of the glide channel 12a. When glide channel 12a is moved in and out, it rides on the bearings 12b and 10c.

The mounting tubes of each pair are parallel to one another and spaced apart to suit the length of the storage box 18 that is to be carried. The storage box is fastened down to the forward and rearward glide channels 12a by suitable fasteners 30, such as self-tapping metal screws extending from a metal strap 31 through the box bottom into the glide channel. Each glide channel 12a is provided on its underside with a stop member 12d that abuts the mounting tube bearing channel 10e to limit the outward travel extent of the glide channel 12a. This travel limit is set so that the glide channels can be extended just far enough for the storage box lid 18a to clear an overhead truck bed 19 when the box lid is opened fully as shown in FIG. 1. The length of glide channel 12a may be such that the glide channel extends almost to the opposite end of the mounting tube thereof when retracted. The outer ends of the glide channels of each pair may be provided with an angle bracket 13 which can mesh with a complementary angle bracket 15 on the outer end of mounting tube 10. These brackets 13-15 can be drilled to provide for insertion of a locking pin or padlock to secure the storage box 18 in its retracted position.

For providing two storage box mounting systems, a second pair of mounting tubes and glides are provided and arranged as shown in FIGS. 1 and 2. As shown, the second pair are arranged to extend toward the opposite side of the truck and its mounting tubes are confined by the same mounting brackets 20-22 and U-bolts 24-26. Thus, as shown in FIG. 2, each forward or rearward set 21 in the two-box mounting system comprises side-by-side mounting tube and glide assemblies oriented in opposite directions. The second pair carry the same numbers as the assembly described hereinabove, but primed. As thus described, the mounting tube and glide assemblies are identical, simplifying their production and installation.

In a typical installation, the mounting tubes would be fabricated from 2×2×3/16 inch steel tubing stock with the mounting channel provided by notching out the upper ⅝ inch; the glide channels would be fabricated from 1⅜×1⅜×3/16 inch steel channel stock; the mounting tube bearing would be a 37/64 ×15/32 inch steel bearing; the glide channel bearing would be a 15/16 ×⅜inch steel bearing; the bearing mounting channel would be fabricated from 1×1⅜×⅛inch steel channel stock; and the bearing axils would be ⅜ inch steel rod.

While the preferred embodiment of the invention has been described herein, variations in the design may be made. The scope of the invention, therefore, is only to be limited by the claims appended hereto.

The embodiments of the invention in which an exclusive property is claimed are defined as follows:

What is claimed is:

1. A storage box mounting system for mounting a storage box to a pair of main frame beams of a vehicle chassis which comprises a pair of storage box mounting assemblies adapted to be fastened transversely to the vehicle main frame beams and protrude outward from one side whereby a storage box may be stowed along an outer side of one of the vehicle main frame beams, each mounting assembly comprising: a mounting tube attachable to the vehicle main frame beams and having a sufficient length to extend therebetween and to further extend laterally outward from one of the main frame beams to carry a glide channel for telescopic movement within an interior guideway therein between extended and retracted positions, said mounting tube having a first portion of a length to extend between the vehicle main frame beams, and having a second portion of a length to extend beyond the vehicle main frame beams; a glide channel telescopically contained in said mounting tube and having a sufficient length to be supportably contained within said interior guideway in said mounting tube when protruding longitudinally outward, with respect to the mounting tube containing said glide channel, to carry the storage box; said mounting tube first portion being adapted to contain an inner end of said glide channel, and said mounting tube second portion being open-topped whereby said glide channel protrudes above the mounting tube open-topped second portion so that a storage box set upon said glide channel may overlay said mounting tube second portion when said glide channel is positioned in the retracted position; said mounting tube having a first rotating bearing means located in a distal end of said second portion for supporting said glide channel; said glide channel having a second rotating bearing means located at the inner end and adapted to contact the interior guideway of said mounting tube for support therein when said glide channel is telescopically extended and retracted in said mounting tube; and vehicle mounting means for attaching each mounting tube to the vehicle main frame beams whereby the storage box may be stored in the retracted position overlaying the mounting tube second portion and may be transported outward from the vehicle by sliding the glide channels telescopically outward from within their respective mounting tubes.

2. The apparatus of claim 1 wherein said vehicle mounting means comprises forward and rearward brackets for attachment to each main frame beam, and clamping means for clamping said mounting tubes to said brackets whereby one mounting tube is provided as a forward mounting tube and the other mounting tube is provideed as a rearward mounting tube.

3. The apparatus of claim 2 further including an additional pair of mounting assemblies which are duplicates of the aforesaid mounting assemblies and provided for an additional storage box with the forward mounting tubes of each pair comprising a forward set and with the mounting tubes of each pair comprising a rearward set; and wherein the mounting tubes in each set arranged such that one laterally extends toward one side of the vehicle and the other laterally extends toward another side of the vehicle when attached thereto whereby left side and right side storage boxes may be carried.

4. The apparatus of claim 2 wherein said first rotating bearing means in said mounting tube second portion includes an open-topped channel member and a bearing member journal-mounted in said channel member; and wherein said glide channel is provided with an extension stop member positioned to abut said channel member to limit the outward telescopic extension of said glide channel.

5. In combination with a vehicle having forward and rearward ends and a pair of vehicle chassis main frame beams, each main frame beam having a bottom and an outer side, and an overhead superstructure carried by the main frame beams with a clearance space present between the overhead superstructure and the bottom of the main frame beams, a storage box mounting system for mounting a storage box to the main frame beams within the clearance space comprising:

a pair of storage box mounting assemblies adapted to be fastened transversely to the vehicle main frame beams and protrude outward from one side whereby a storage box may be stowed along the outer side of one of the vehicle main frame beams, each mounting assembly comprising: a mounting tube attachable to the vehicle main frame beams and having a sufficient length to extend therebetween and to further extend laterally outward from one of the main frame beams to carry a glide channel for telescopic movement within an interior guideway therein between extended and retracted positions, and mounting tube having a first portion of a length to extend between the vehicle main frame beams, and having a second portion of a length to extend beyond the vehicle main frame beams; a glide channel telescopically contained in said mounting tube and having a sufficient length to be supportably contained within said interior guideway in said mounting tube when protruding longitudinally outward, with respect to the mounting tube containing said glide channel, to carry a storage box; said mounting tube first portion being adapted to contain an inner end of said glide channel, and said mounting tube second portion being open-topped whereby said glide channel protrudes above the mounting tube open-topped second portion so that a storage box set upon said glide channel may overlay said mounting tube second portion when said glide channel is positioned in the retracted position; said mounting tube having a first rotating bearing means located in a distal end of said second portion for supporting said glide channel;

said glide channel having a second rotating bearing means located at the inner end thereof and adapted to contact the interior guideway of said mounting tube for support therein when said glide channel is telescopically extended and retracted in said mounting tube;

vehicle mounting means for attaching each mounting tube to the vehicle main frame beams and positioning each mounting tube beneath the main frame beams whereby the storage box may be stored in the retracted position overlaying the mounting tube second portion and may be transported laterally outward from the vehicle by sliding the glide channels telescopically outward from within their respective mounting tubes; said vehicle mounting means comprising, with respect to the forward and rearward ends of the vehicle, forward and rearward brackets for attachment to each main frame beam, and clamping means for clamping said mounting tubes to said brackets whereby one mounting tube is provided as a forward mounting tube and the other mounting tube is provided as a rearward mounting tube; and a storage box supported on and fastened to the glide channels contained in the forward and rearward mounting tubes whereby when said glide channels are telescopically retracted the storage box will overlay the open-topped second portions of the forward and rearward mounting tubes, and whereby when said glide channels are telescopically extended the storage box will be positioned outward from an adjacent main frame beam a sufficient distance to clear any vehicle overhead superstructure that may be carried by the vehicle main frame beams.

6. The apparatus of claim 5 wherein said storage box comprises a storage container having bottom, side and end walls defining an interior storage space, and hinged top fastened to the container side wall facing the adjacent main frame beam; and wherein said glide channels are telescopically extendable a sufficient distance whereby said container top may be hingeably opened clear of the vehicle overhead superstructure to fully expose the container interior storage space.

7. The apparatus of claim 5 further including an additional pair of mounting assemblies which are duplicates of the aforesaid mounting assemblies and provided for an additional storage box with the forward mounting tubes of each pair comprising a forward set and with the rearward mounting tubes of each pair comprising a rearward set; and wherein the mounting tubes in each set are arranged such that one laterally extends toward one side of the vehicle and the other laterally extends toward the other side of the vehicle when attached thereto whereby left side and right side storage boxes may be carried.

8. The apparatus of claim 7 further including another storage box provided for the additional pair of mounting assemblies comprising a storage container having bottom, side and end walls defining an interior storage space, and a hinged top fastened to the container side wall facing the adjacent main frame beam; and wherein the glide channels of said additional pair of mounting assemblies are telescopically extendable a sufficient distance whereby said container top may be hingeably opened clear of the vehicle overhead superstructure to fully expose the container interior storage space.

9. The apparatus of claim 5 wherein said first rotating bearing means in said mounting tube second portion includes an open-topped channel member and a bearing member journal-mounted in said channel member; and wherein said glide channel is provided with an extension stop member positioned to abut said channel member to limit the outward telescopic extension of said glide channel.

10. The apparatus of claim 9 wherein said storage box comprises a storage container having bottom, side and end walls defining an interior storage space, and a hinged top fastened to the container side wall facing the adjacent main frame beam; and wherein said glide channels are telescopically extendable a sufficient distance whereby said container top may be hingeably opened clear of the vehicle overhead superstructure to fully expose the container interior storage space.

* * * * *